(12) United States Patent
Kim et al.

(10) Patent No.: US 7,642,008 B2
(45) Date of Patent: Jan. 5, 2010

(54) RECHARGEABLE BATTERY

(75) Inventors: Yong-Sam Kim, Suwon-si (KR);
Seok-Yoon Yoo, Suwon-si (KR);
Hyun-Seok Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 447 days.

(21) Appl. No.: 11/282,558

(22) Filed: Nov. 18, 2005

(65) Prior Publication Data

US 2006/0115727 A1    Jun. 1, 2006

(30) Foreign Application Priority Data

Nov. 30, 2004    (KR) .................. 10-2004-0099304

(51) Int. Cl.
*H01M 2/02*    (2006.01)
*H01M 2/08*    (2006.01)
(52) U.S. Cl. ................ 429/181; 429/174; 429/180; 429/183
(58) Field of Classification Search ........... 429/181, 429/183, 174, 180
See application file for complete search history.

(56) References Cited

U.S. PATENT DOCUMENTS

| 4,598,466 A | * | 7/1986 | Arenas et al. ............ 29/623.2 |
| 2005/0118501 A1 | * | 6/2005 | Hashimoto et al. ........ 429/180 |

FOREIGN PATENT DOCUMENTS

| DE | 3214225 | * | 10/1983 |
| KR | 1020060000520 | * | 6/2004 |

* cited by examiner

*Primary Examiner*—Patrick Ryan
*Assistant Examiner*—Thomas H. Parsons
(74) *Attorney, Agent, or Firm*—Christie, Parker & Hale, LLP

(57) ABSTRACT

A rechargeable battery includes an electrode assembly including a positive electrode, a negative electrode, and a separator interposed between the two electrodes, a container for receiving the electrode assembly inside, and a cap assembly fixed to the container. The cap assembly includes a cap plate fixed to the container, an external terminal disposed in the cap plate to electrically be coupled with the electrode assembly, and a tubular body that surrounds the external terminal to fix the external terminal to the cap plate. The external terminal includes at least one groove formed toward inside of the external terminal for fastening the external terminal to the tubular body.

17 Claims, 7 Drawing Sheets

RECHARGEABLE BATTERY

CROSS REFERENCE TO RELATED APPLICATION

This application claims priority to and the benefit of Korean Patent Application No. 10-2004-0099304, filed on Nov. 30, 2004, the entire content of which is incorporated herein by reference.

FIELD OF THE INVENTION

The present invention relates to an assembly structure of an external terminal for a rechargeable battery.

BACKGROUND OF THE INVENTION

Unlike non-rechargeable batteries, rechargeable batteries may be recharged. Non-aqueous electrolyte rechargeable batteries with high energy density have recently been developed as high power rechargeable batteries. Lower power batteries in which battery cells are made into a battery pack are used as the power source for various portable electronic devices such as cellular phones, laptop computers, and camcorders. Larger battery packs which are formed by connecting several to tens of the rechargeable battery cells may be suitable for motor driven devices such as the electric vehicles.

Rechargeable batteries may be classified into different categories based on external shape, for example, rectangular box and cylindrical shapes. Rechargeable batteries include an electrode assembly in which a long rectangular-shaped positive plate, a long rectangular-shaped negative plate, and a separator that is interposed between the plates are spiral-wound together. Alternatively, a positive plate, a negative plate, and a separator may be stacked in a multiple layer structure. The electrode assembly is inserted into a container, and a cap assembly is mounted on the container to form the battery.

The cap assembly of such rechargeable batteries has an external terminal that is coupled to the electrode assembly. The cap assembly is fixed to the container by welding, etc. to seal the container.

Generally, the external terminal of the cap assembly is inserted into a hole that is formed on the cap plate of the cap assembly. Then, a packing and an O-ring are disposed between the hole and the external terminal to provide electrical insulation and a tight fit.

The external terminal is coupled with the cap plate by a nut that is fastened to a screw thread formed on the outer circumferential surface of the external terminal. The packing and O-ring are pressed against the nut to seal the hole.

However, the above sealing structure and installation of the external terminal is problematic because it requires many parts which raise the manufacturing cost, and complicates the manufacturing process which decreases the manufacturing efficiency.

SUMMARY OF THE INVENTION

The present invention provides a rechargeable battery in which the assembly structure of the cap plate and the external terminal are improved to simplify the assembly process and to reduce assembly time.

According to one embodiment of the present invention, a rechargeable battery includes an electrode assembly having a positive electrode, a negative electrode, and a separator interposed between the two electrodes, a container for receiving the electrode assembly inside, and a cap assembly that is fixed to the container. The cap assembly includes a cap plate that is fixed to the container, an external terminal that is disposed in the cap plate and electrically coupled with the electrode assembly, and a tubular body that surrounds the external terminal to fix the external terminal to the cap plate. The external terminal includes at least one groove that is formed toward the inside of the external terminal and is fastened to the tubular body.

The external terminal may include at least one groove having a preformed shape on its circumferential surface. The groove may have a continuous or non-continuous shape.

The external terminal may be inserted into a through hole formed on the cap plate and the tubular body may be arranged around the through hole to be in close contact with the external terminal.

The tubular body may include flanges that extend to the interior surface of the cap plate. The tubular body may be integrally formed with the cap plate and it may have a cylindrical shape. The tubular body may be fastened to the external terminal by a press.

The planar cross section of the external terminal and the planar cross section of the inner space of the tubular body may have the same shape.

A sealing member may be interposed between the tubular body and the external terminal, and the sealing member may include a gasket of a cylindrical shape to closely contact the inner circumferential surface of the tubular body. The sealing member may be made of a resin that is injected and cured between the tubular body and the external terminal.

Flanges may be formed at both ends of the sealing member and the flanges may extend to the upper end of the tubular body and the interior surface of the cap plate.

According to another embodiment of the present invention, a method for manufacturing a battery includes inserting a tubular body into a through hole of a cap plate of a cap assembly to be assembled with an external terminal, inserting the external terminal into the tubular body, and press molding the tubular body from the outside of the tubular body whereby the tubular body closely contacts the external terminal and at least one groove is formed toward inside of the external terminal.

According to another embodiment of the present invention, a method for manufacturing a battery includes inserting a sealing member into a through hole of a cap plate of a cap assembly to be assembled with an external terminal, inserting the external terminal into the through hole in which the sealing member is inserted, inserting a tubular body to surround the external terminal, and press molding the tubular body from the outside of the tubular body whereby the tubular body closely contacts the external terminal and at least one groove is formed toward inside of the external terminal.

DETAILED DESCRIPTION

The following description refers to a hexahedronal rechargeable battery with a positive terminal and a negative terminal that are formed on a cap plate as external terminals. However, the present invention is not limited to the structure described below and other shapes battery such as a cylinder may be used.

Figure 1:
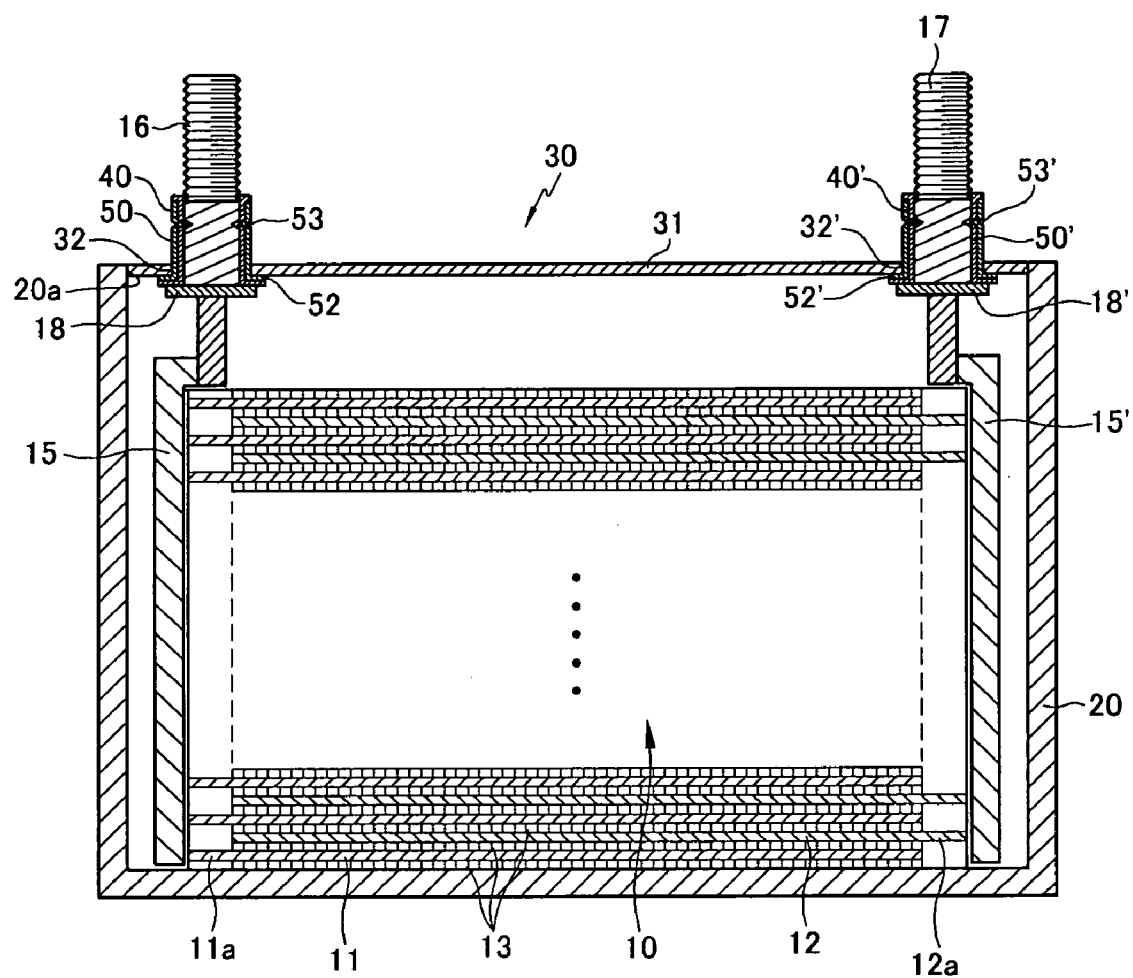
FIG. 1 is a schematic cross sectional view of a rechargeable battery according to an embodiment of the present invention.

As shown in FIG. 1, the rechargeable battery of first embodiment includes an electrode assembly 10 having a positive electrode 11, a negative electrode 12, and a separator 13 interposed between the two electrodes, a container 20 having a space to receive the electrode assembly 10 inside the container, and a cap assembly 30 that is mounted on an opening 20a of the container 20.

The cap assembly 30 includes a cap plate 31 mounted on the opening 20a of the container 20 to seal it. The cap assembly also includes a positive terminal 16 and a negative terminal 17 coupled with the positive electrode 11 and the negative electrode 12, respectively, through lead elements 15, 15' and are assembled with the cap plate 31 to expose a portion of the terminals outside the container 20.

The positive terminal 16 and the negative terminal 17 are inserted through holes 32, 32' respectively, that are formed on the cap plate 31. Tubular bodies 50, 50' which surround the positive terminal 16 and the negative terminal 17 and fix the terminals 16, 17 to the cap plate 31 are formed around the through hole 32 in the cap plate 31.

The external terminals 16, 17 are tightly fixed to the cap plate 31 of the cap assembly 30 through the tubular bodies 50, 50'. The tubular bodies 50, 50' are pressed against the external terminals 16, 17 to make close contact with the cap assembly 30.

The container 20 may include, but is not limited to a conductive metal such as aluminum, an aluminum alloy, and steel plated with nickel. The container 20 may have a rectangular-box shape that has an inner space to receive the electrode assembly 10.

The electrode assembly 10 has a jellyroll structure such that the positive electrode 11 and the negative electrode 12 including collectors coated with a positive active material and a negative active material, respectively, and the separator 13 interposed between them are stacked in a multiple layer structure and then wound into a jellyroll configuration.

The positive electrode 11 and the negative electrode 12 have uncoated regions 11a, 12a, respectively, that are absent active materials along one edge.

The uncoated regions 11a, 12a are arranged to face each other when assembling the electrode assembly 10. The positive uncoated region 11a is coupled with a lead element 15 that contacts the positive external terminal 16. The negative uncoated region 12a is coupled with a lead element 15' that contacts the negative external terminal 17.

The positive terminal 16 and the negative terminal 17 have screw threads in portions which pass through the tubular bodies 50, 50' and are exposed to the exterior. The screw threads are formed to fasten connectors (not shown) that couple multiple rechargeable batteries by the screw connections to form a battery module.

The terminals 16, 17 also have a flange 18, 18' in their lower portion that is positioned on the interior of the cap plate 31.

Figure 2:
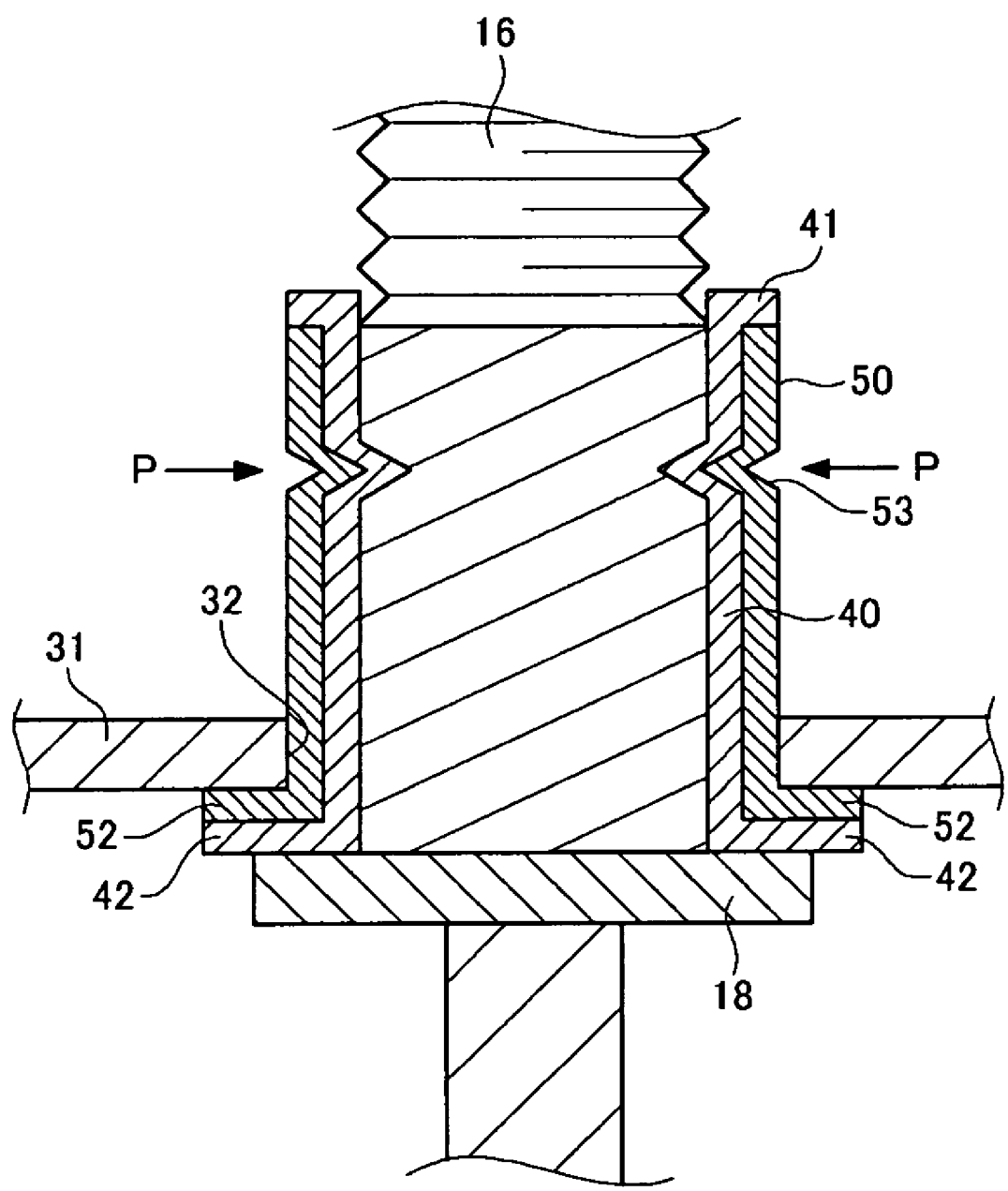
FIG. 2 is a cross sectional view of a cap assembly assembled with an external terminal of the rechargeable battery according to an embodiment of the present invention.

As shown in FIG. 2, the tubular bodies 50, 50' have opened ends into which the respective external terminals 16,17 are insertable.

The externally exposed positive external terminal 16 and negative external terminal 17 include at least one groove 53, 53' that is formed toward the interior of the external terminals on the outer circumferential surface of the external terminals 16, 17 which contacts the tubular bodies 50, 50'. The grooves 53, 53' are formed after the external terminals 16, 17 are inserted into the tubular bodies while the terminals 16, 17 are fastened to the tubular bodies 50, 50'. Specifically, the grooves 53, 53' are formed after the outer circumferential surfaces of the tubular bodies 50, 50' and the outer circumferential surfaces of the external terminals 16, 17 which contact the tubular bodies 50, 50' are pressed together. The terminals 16, 17 may include at least one groove preformed on its circumferential surface, thereby ensuring a tight seal between the terminal and the tubular body. The grooves 53, 53' may have a continuous or non-continuous shape.

The planar cross section of the external positive terminal 16 and external negative terminal 17 has the same shape as the planar cross section of the inner space of the tubular bodies 50, 50'. The tubular bodies 50, 50' include a flange 52, 52' protruding toward the interior surface of the cap plate 31.

In one exemplary embodiment, the inside diameter of the tubular bodies 50, 50' is sized for the terminals 16, 17 to be insertable thereto.

The positive terminal 16 and the negative terminal 17 have screw threads which pass through the tubular bodies 50, 50', respectively, to be exposed to the exterior, and they have flanges 18,18' which are positioned inside the container 20.

The screw thread is a portion formed to fasten connectors (not shown) electrically connecting batteries by screw connection when plural secondary batteries are formed into a battery module.

The flanges 18, 18' closely contact the lower surface of the cap plate 31 to prevent separation of the terminals 16, 17 from the cap plate 31 to the outside, when the positive terminal 16 and the negative terminal 17 are inserted into the through hole 32 to be fastened with the cap plate 31.

Sealing members 40, 40' may be interposed between the respective tubular bodies 50, 50' and external terminals 16, 17. The sealing members 40, 40' may include a gasket of a cylindrical shape to be in close contact with the inner circumferential surface of the tubular bodies 50, 50'.

Flanges 41, 42 may be formed at both ends of the sealing members 40, 40' to prevent separation of the sealing members and the tubular bodies. The sealing members 40, 40' may be made using a polymer resin which is injected between the tubular bodies and the external terminals, and then cured. Examples of the polymer resin include polyphenylene sulfide (PPS), polyperfluoroalkoxyethylene (PFA), polypropylene (PP), and so on.

Figure 3:
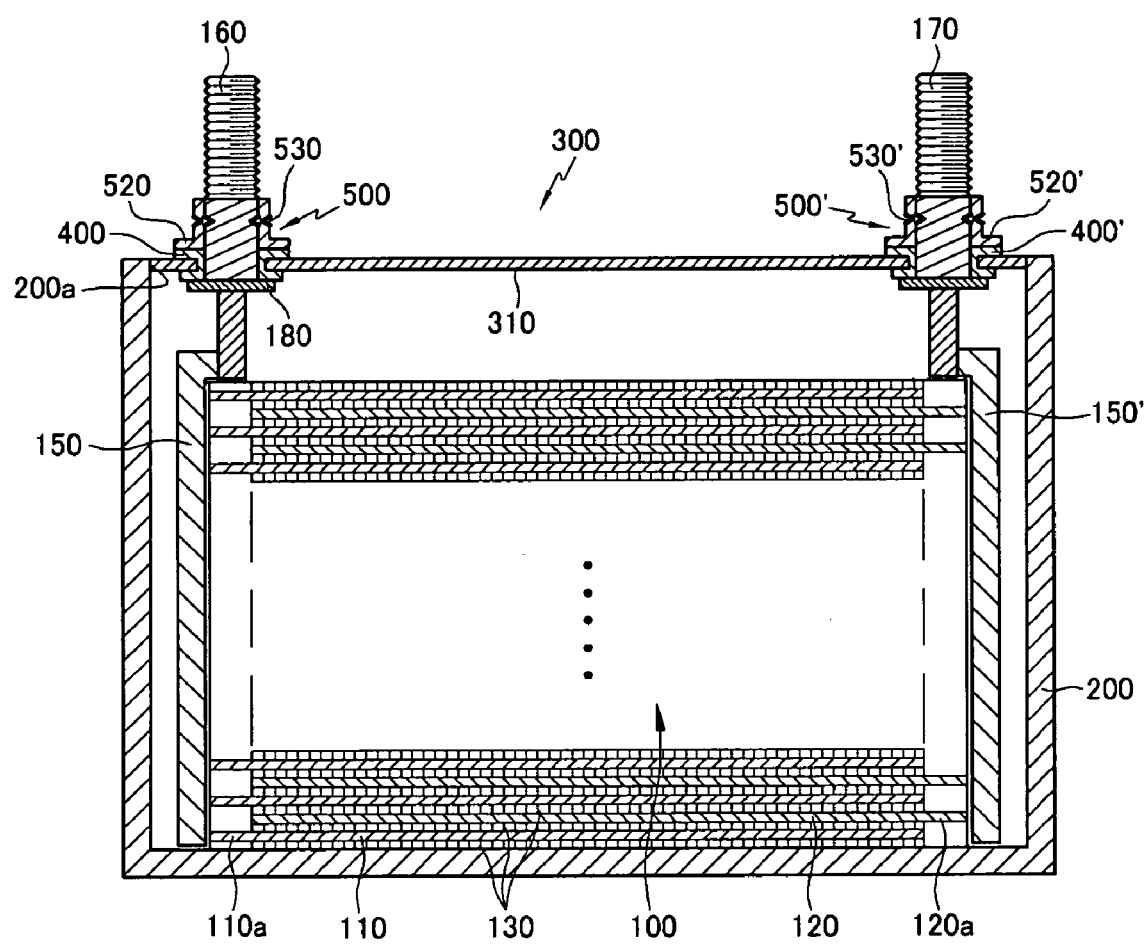
FIG. 3 is a schematic cross sectional view of a rechargeable battery according to another embodiment of the-present invention.

As shown in FIG. 3, the rechargeable battery includes an electrode assembly 100 having a positive electrode 110, a negative electrode 120, and a separator 130 interposed between the two electrodes, a container 200 having a space to receive the electrode assembly 100 inside the container, and a cap assembly 300 that is mounted on an opening 200a of the container 200.

The cap assembly 300 includes a cap plate 310 that is mounted on the opening 200a of the container 200 to seal it. The cap assembly also includes a positive terminal 160 and a negative terminal 170 that are coupled with a lead portion 110a of the positive electrode 110 and a lead portion 120a of the negative electrode 120, respectively, through lead elements 150, 150' and are assembled with the cap plate 310 to expose a portion thereof outside the container 200.

The positive terminal 160 and the negative terminal 170 are inserted into a through hole 320 (FIG. 4A) that is formed on the cap plate 310. Sealing members 400, 400' are mounted in the through hole 320 while they surround the positive terminal 160 and the negative terminal 170 and fix the terminals 160, 170 to the cap plate 310. Tubular bodies 500, 500' which surround the positive terminal 160 and the negative terminal 170 and fix the terminals 160, 170 to the cap plate 310 are formed around the through hole 320 in the cap plate 310.

The external terminals 160, 170 are tightly fixed to the cap plate 310 of the cap assembly 300 through the sealing member 400, 400' and the tubular bodies 500, 500'.

Figure 4A:
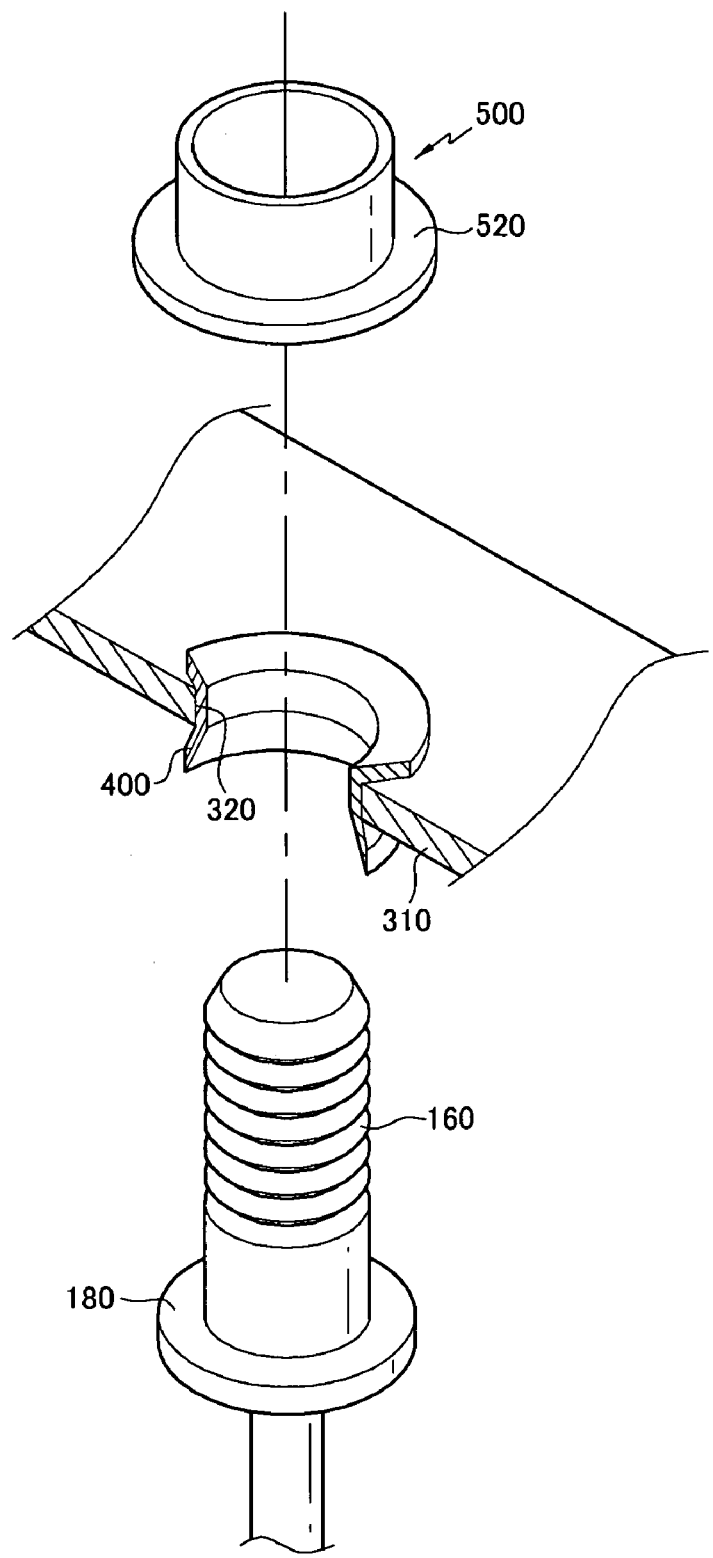
FIG. 4A is an exploded partial cross sectional view of a cap assembly assembled with an external terminal of the rechargeable battery of FIG. 3.
Figure 4B:
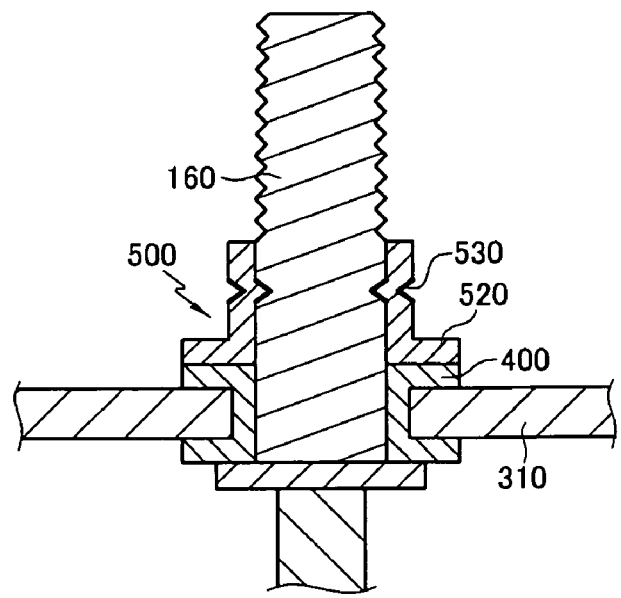
FIG. 4B is a cross sectional view of the cap assembly after the cap assembly has been assembled with the external terminal of the rechargeable battery according to yet another embodiment of the present invention.

As shown in FIG. 4A and 4B, the tubular bodies 500, 500' have open ends into which the external terminals 160,170 are insertable.

The externally exposed positive external terminal 160 and negative external terminal 170 include at least one groove 530, 530' that is formed toward the interior of the external terminals and is fastened to the tubular bodies 500, 500'. The grooves 530, 530' are formed while the terminals 160, 170 are fastened to the respective tubular bodies 500, 500'.

The terminals 160, 170 may include at least one preformed groove to form a tight seal between the terminals and the tubular bodies. The grooves 530, 530' may have a continuous or non-continuous shape.

The planar cross section of the external positive terminal 160 and external negative terminal 170 has the same shape as the planar cross section of the inner space of the tubular bodies 500, 500'. The tubular bodies 500, 500' include flanges 520, 520' that protrude to the interior surface of the cap plate 310.

The inside diameter of the tubular bodies 500, 500' may be sized such that the terminals 160,170 are insertable thereinto.

In the present embodiment, the tubular body 500 is fixed to the external terminals 160 through pressing. As shown FIGS. 4A and 4B, when the external terminal 160 is inserted into the tubular body 500, the external member is pressed down the sealing member 400. The tubular body 500 is pressed on its circumferential surface, thereby fixing the tubular body 500 to the external terminal 160.

As shown in FIG. 4B, at least one groove 530 is formed toward the interior of the circumferential surface of the external terminal which contacts the tubular body 500. The groove 530 is formed by pressing the tubular body 500 and the external terminal 160. Although FIGS. 4A and 4B show only one terminal 160, it will be understood by a person of skill in the art that the above-described embodiment is also applicable to the second terminal 170.

The sealing member 400 inserted in the through hole 320 of the cap plate 310 is pressed by the flange 180 of the external terminal 160 on the interior surface of the cap plate 310 and is also pressed by the flange 520 of the tubular body 500 on the exterior surface of the cap plate 310. Thereby, the sealing member 400 maintains a tight seal between the cap plate 310 and the external terminal 160.

As shown FIGS. 4A and 4B, the sealing member 400 has a cylindrical shape adapted to receive external terminal 160 therein. The sealing member 400 also has a narrow center insertable in the through hole 320, and flanged ends to contact the interior and exterior of the cap plate.

A first end of the sealing member 400 is closely adjacent to the flange 180 of the external terminal 160 at the interior of the cap plate 310. A second end of the sealing member 400 is closely adjacent to and pressed by the flange 520 of the tubular body 500 at the exterior of the cap plate 310.

The sealing members 400, 400' may include a gasket and may be made using a polymer resin injected between the tubular bodies and the external terminals and cured. Examples of the polymer include polyphenylene sulfide (PPS), polyperfluoroalkoxyethylene (PFA), polypropylene (PP), and so on.

In FIG. 3, an electrode assembly 100, a case 200, and external terminals 160 and 170 have the same structure as in FIG. 1.

Figure 5:
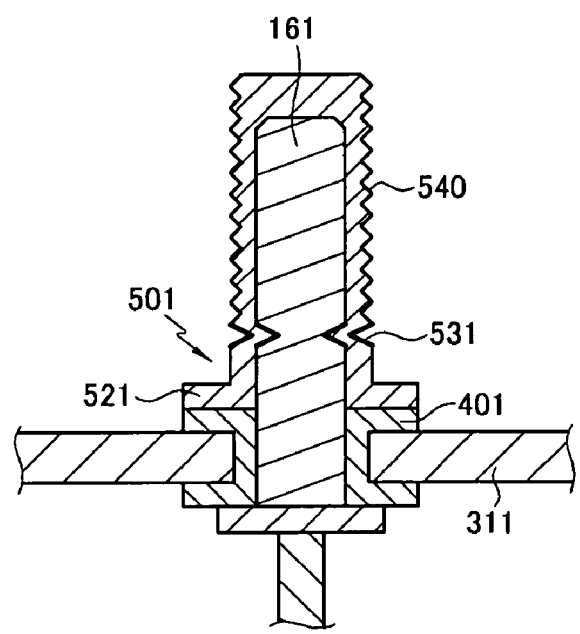
FIG. 5 is a cross sectional view of a cap assembly assembled with an external terminal of a rechargeable battery according to still another embodiment of the present invention.

As shown in FIG. 5, a tubular body 501 covers the external terminal 161. The tubular body 501 has an inside diameter generally corresponding to the diameter of the external terminal 161. The tubular body 501 has a closed end and open end to cover the external terminal 161. The tubular body 501 also includes a flange 521 which extends from the open end. The flange 521 may press the sealing member 401 to contact the cap plate 311.

The tubular body 501 covers the external terminal 161 and acts as an external terminal. The tubular body 501 may include screw threads 540 on the circumferential surface.

The tubular body 501 is assembled with the external terminal 161 by a press. As shown in FIG. 5, the external terminal 161 is inserted into the tubular bodies 501 and the tubular body 501 is squeezed on its circumferential surface to form a groove 531 while the tubular body is pressed down on the sealing member 401. The external terminal 161 which contacts the tubular body 501 is also squeezed to fix the tubular body 501 to the external terminal 161.

Figure 6:
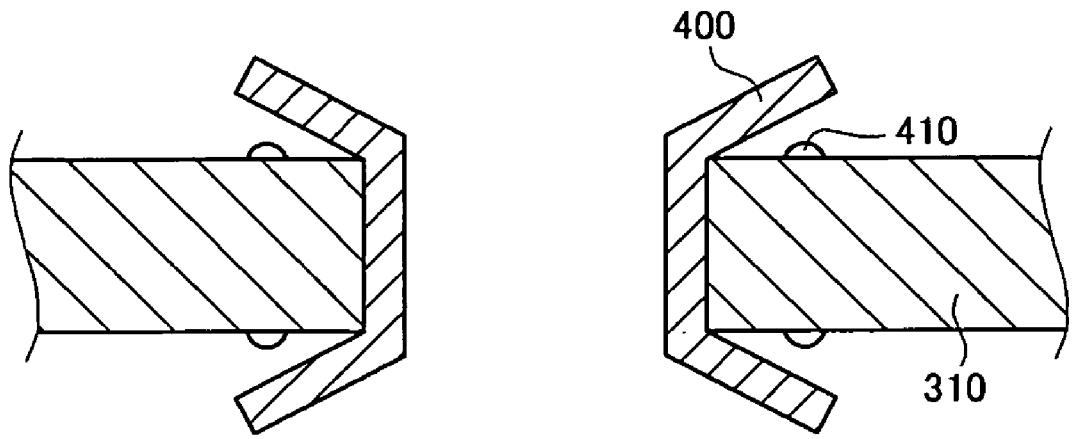
FIGS. 6 and 7 are cross sectional views showing a sealing member assembled with a cap plate according to still other embodiments of the present invention.
Figure 7:
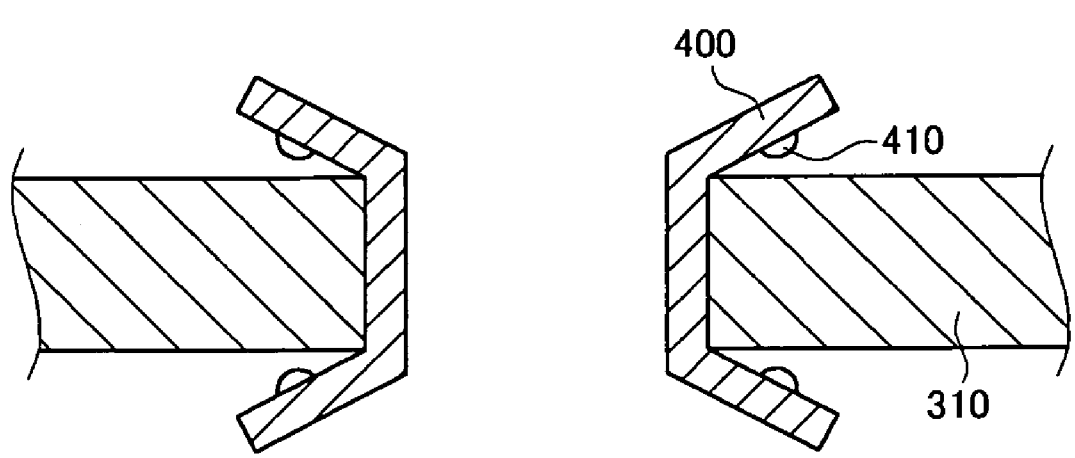

As shown in FIGS. 6 and 7, the sealing member 400 and/or cap plate 310 may include protrusions 410 which are formed at a junction between the sealing member 400 and the cap assembly 310 to improve sealing therebetween.

FIG. 6 shows protrusions 410 which are formed on interior and exterior surfaces of the cap plate 310. FIG. 7 shows protrusions on the upper and lower ends of the sealing member 400.

The protrusions have an arc-shaped cross section and may be formed in a circular shape on the sealing member 400 and/or cap plate 310.

When the sealing member 400 closely contacts the cap plate 310 through the flanges 180 of the external terminal 160, 170 and the tubular bodies 500, the protrusions 410 allow the cap plate and the sealing member to be pressed to each other, thus enhancing the connection between the cap plate and the sealing member.

The following will describe the assembly of the terminals with the tubular bodies referring to FIGS. 1 and 2 according to one embodiment of the present invention. In the present embodiment, the positive terminal 16 and the negative terminal 17 have the same shape, and they are inserted into the respective tubular bodies 50, 50' of the same shape. FIG. 2 shows only the structure of the positive terminal 16, which is applied correspondingly to the negative terminal 17.

The terminal 16 is installed in the cap assembly 30 by the following process. The tubular body 50 is inserted into the through hole 32 of the cap plate 31 and then the terminal 16 is inserted to pass through the opening of the tubular body 50.

After the terminal 16 is completely inserted into the tubular body 50 and the flange 18 formed on the lower end of the terminal 16 contacts the lower end flange 52 of the tubular body 50, the tubular body 50 is press molded from the exterior toward the terminal 16 by operating a press (P), as indicated schematically, for example, in FIG. 2.

The following will describe how to assemble the terminals with the tubular bodies referring to FIGS. 3, 4A and 4B according to alternate embodiments of the present invention. The positive terminal 160 and the negative terminal 170 have the same shape, and they are inserted into respective tubular bodies 500, 500' of the same shape. FIGS. 4A and 4B show only the structure of the positive terminal 160, which is applied correspondingly to the negative terminal 170.

The terminal 160 is installed in the cap assembly 300 by the following process. The sealing member 400 is inserted into the through hole 320 of the cap plate 310 and is inserted to pass through the center of the sealing member 400.

After the terminal 160 is completely inserted into the tubular body 500 and the flange 180 formed on the lower end of the terminal 160 contacts the lower end of the sealing member 400, the tubular body 500 is installed on the terminal 160 externally exposed from the cap plate 310.

When the terminal 160 is inserted into the tubular body 500, the flange 520 of the tubular body 500 contacts the upper end of the sealing member 400.

When the tubular body 500 and the terminal 160 are pressed to the sealing member 400, the flange 520 of the tubular body 500 and the flange 180 of the terminal 160 press the sealing member 400 on the interior and the exterior of the cap plate 310.

In this way, the sealing member 400 is tightly sealed to the cap plate 310. Additionally, the tubular body 500 is pressed toward the terminal 160 so that the tubular body 500 is tightly sealed to the terminal 160 and fixed to the cap plate 310.

Figure 8:
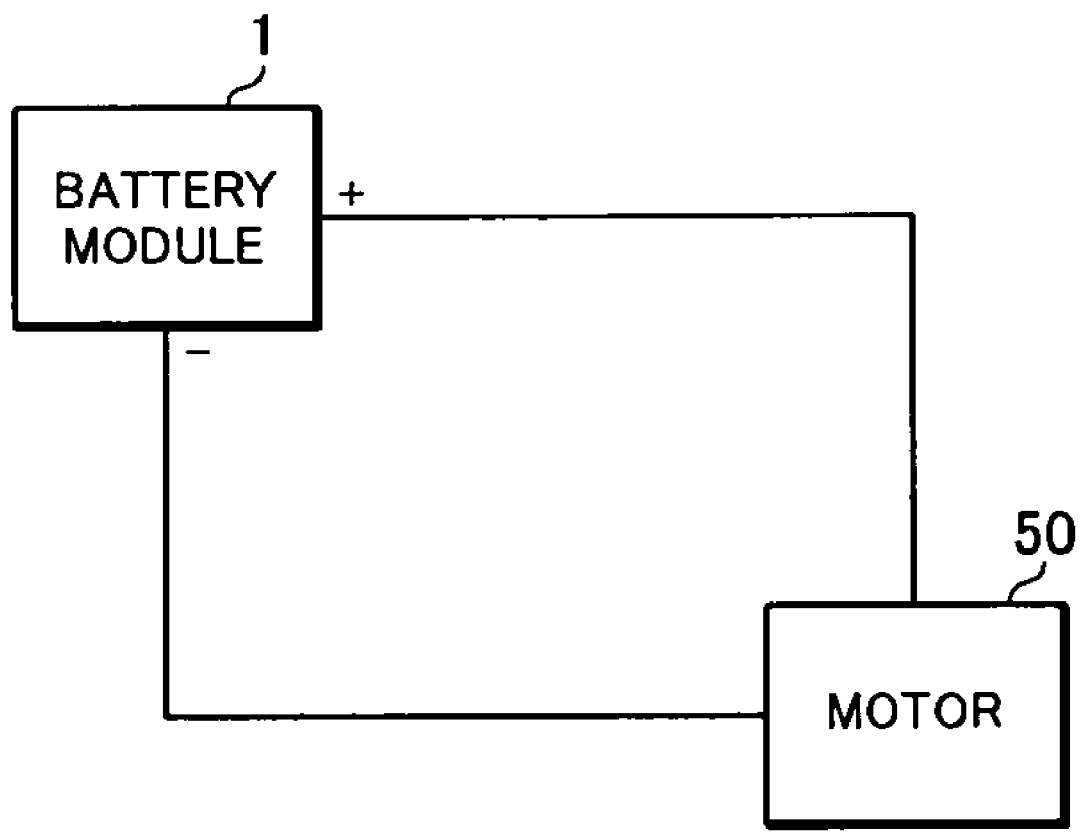
FIG. 8 is a schematic block diagram showing a rechargeable battery driving a motor according to an embodiment of the present invention.

A plurality of the above-mentioned rechargeable batteries is arranged with and is connected to each other in series or in parallel to provide a battery module. FIG. 8 is a schematic block diagram of a battery module 1 which includes the rechargeable batteries as discussed in FIGS. 1 and 3 driving a motor 50.

The rechargeable battery of the present invention may be used as the power source for motor driving devices requiring high power characteristics, such as the hybrid electric vehicles, electric vehicles, wireless vacuum cleaners, motorbikes, or motor scooters.

According to the present embodiments, the external terminal may be easily mounted in a cap assembly to thereby save time and effort in the assembly of the external terminal.

In addition, the seal between the external terminal and the cap assembly is improved to enhance the battery performance.

Moreover, the number of parts necessary for assembling the external terminal and maintaining the tightness may be reduced to save the manufacturing cost of the secondary battery.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A rechargeable battery comprising:
   an electrode assembly including a positive electrode, a negative electrode, and a separator between the positive electrode and the negative electrode;
   a container adapted to receive the electrode assembly;
   a cap assembly fixed to the container, the cap assembly including a cap plate fixed to the container, an external terminal in the cap plate and electrically coupled to the electrode assembly, a tubular body surrounding the external terminal, the tubular body including a flange extending along an interior surface of the cap plate, and a sealing member between the tubular body and the external terminal, wherein the external terminal has at least one groove for fixing the external terminal to the cap plate.

2. The rechargeable battery of claim 1, wherein the at least one groove has a non-continuous shape.

3. The rechargeable battery of claim 1,
   wherein the external terminal is insertable into a through hole on the cap plate, and
   wherein the tubular body is around the through hole to be in contact with the external terminal.

4. The rechargeable battery of claim 1, wherein the tubular body is integral with the cap plate.

5. The rechargeable battery of claim 1, wherein a planar cross section of the external terminal and a planar cross section of an interior space of the tubular body are the same shape.

6. The rechargeable battery of claim 1, wherein the tubular body is cylindrical.

7. The rechargeable battery of claim 1, wherein the battery drives a motor.

8. A rechargeable battery comprising:
   an electrode assembly including a positive electrode, a negative electrode, and a separator between the two electrodes;
   a container adapted to receive the electrode assembly;
   a cap assembly fixed to the container, the cap assembly including a cap plate fixed to the container, an external terminal in the cap plate and electrically coupled to the electrode assembly, a sealing member in a through hole of the cap assembly, the sealing member between the external terminal and the through hole, and a tubular body surrounding the external terminal, wherein the sealing member has a flange at either end to prevent separation of the sealing member and the tubular body; wherein the external terminal has at least one press-molded groove for fixing the external terminal to the cap plate.

9. The rechargeable battery of claim 8, wherein the at least one press-molded groove has a non-continuous shape.

10. The rechargeable battery of claim 8,
    wherein the external terminal is insertable into a through hole on the cap plate, and
    wherein the tubular body is around the through hole to be in contact with the external terminal.

11. The rechargeable battery of claim 8, wherein the tubular body is integral with the cap plate.

12. The rechargeable battery of claim 8, wherein a planar cross section of the external terminal and a planar cross section of an inner space of the tubular body are the same shape.

13. The rechargeable battery of claim 8, wherein the tubular body is cylindrical.

14. The rechargeable battery of claim 8, wherein the sealing member and/or the cap assembly includes protrusions at a junction between the sealing member and the cap assembly.

15. The rechargeable battery of claim 8, wherein the battery drives a motor.

16. A method for manufacturing a rechargeable battery, the rechargeable battery having an electrode assembly, a container adapted to receive the electrode assembly, and a cap assembly fixed to the container, the cap assembly including a cap plate fixed to the container, an external terminal disposed through the cap plate and electrically coupleable to the electrode assembly, the method comprising:

inserting a tubular body into a through hole of the cap plate, the tubular body adapted to be assembled with the external terminal;

inserting the external terminal into the tubular body; and press molding the tubular body from an exterior of the tubular body whereby the tubular body closely contacts the external terminal and forms at least one groove on an interior of the external terminal.

17. A method for manufacturing a rechargeable battery, the rechargeable battery having an electrode assembly, a container adapted to receive the electrode assembly, and a cap assembly fixed to the container, the cap assembly including a cap plate fixed to the container and an external terminal disposed through the cap plate and electrically coupleable to the electrode assembly, the method comprising:

inserting a sealing member into a through hole of the cap assembly such that the sealing member is between the external terminal and the through hole;

inserting the external terminal into the sealing member;

inserting a tubular body over the external terminal to surround the external terminal; and press molding the tubular body from an outside of the tubular body whereby the tubular body closely contacts the external terminal and at least one groove is formed toward an interior of the external terminal such that the sealing member penetrates a circumferential surface of the external terminal.

\* \* \* \* \*